(12) United States Patent
Lu

(10) Patent No.: US 9,158,399 B2
(45) Date of Patent: Oct. 13, 2015

(54) UNLOCK METHOD AND MOBILE DEVICE USING THE SAME

(71) Applicant: HTC Corporation, Taoyuan County (TW)

(72) Inventor: Tai-Ling Lu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 140 days.

(21) Appl. No.: 13/802,549

(22) Filed: Mar. 13, 2013

(65) Prior Publication Data

US 2014/0267064 A1    Sep. 18, 2014

(51) Int. Cl.
*G06F 3/041* (2006.01)
*G06F 3/0488* (2013.01)
*H04M 1/725* (2006.01)

(52) U.S. Cl.
CPC .............. *G06F 3/041* (2013.01); *G06F 3/0488* (2013.01); *H04M 1/72519* (2013.01)

(58) Field of Classification Search
None
See application file for complete search history.

(56) References Cited

U.S. PATENT DOCUMENTS

| | | | | |
|---|---|---|---|---|
| 7,480,870 | B2 * | 1/2009 | Anzures et al. | 715/772 |
| 8,046,721 | B2 | 10/2011 | Chaudhri | |
| 8,806,383 | B2 * | 8/2014 | Nguyen et al. | 715/863 |
| 2004/0021643 | A1 * | 2/2004 | Hoshino et al. | 345/173 |
| 2007/0150826 | A1 * | 6/2007 | Anzures et al. | 715/772 |
| 2008/0055273 | A1 * | 3/2008 | Forstall | 345/173 |
| 2008/0278455 | A1 * | 11/2008 | Atkins et al. | 345/173 |
| 2010/0060586 | A1 * | 3/2010 | Pisula et al. | 345/169 |
| 2010/0325721 | A1 * | 12/2010 | Bandyopadhyay et al. | 726/19 |
| 2012/0084734 | A1 * | 4/2012 | Wilairat | 715/863 |
| 2012/0182234 | A1 * | 7/2012 | Huang et al. | 345/173 |
| 2012/0200514 | A1 * | 8/2012 | Allen | 345/173 |
| 2012/0286925 | A1 * | 11/2012 | Huang | 340/5.2 |
| 2012/0302167 | A1 * | 11/2012 | Yun et al. | 455/41.2 |
| 2013/0069893 | A1 * | 3/2013 | Brinda et al. | 345/173 |
| 2013/0147733 | A1 * | 6/2013 | Lin | 345/173 |
| 2013/0201199 | A1 * | 8/2013 | Nguyen et al. | 345/589 |
| 2013/0271400 | A1 * | 10/2013 | Yao et al. | 345/173 |
| 2014/0137045 | A1 | 5/2014 | Ding | |
| 2014/0195926 | A1 * | 7/2014 | Hussain | 715/750 |
| 2014/0267064 | A1 * | 9/2014 | Lu | 345/173 |

FOREIGN PATENT DOCUMENTS

| | | |
|---|---|---|
| CN | 101650633 B | 10/2011 |
| CN | 102566927 A | 7/2012 |
| CN | 102681785 A | 9/2012 |

OTHER PUBLICATIONS

Office action mailed on Feb. 9, 2015 for the Taiwan application No. 102120966, filed Jun. 13, 2013, p. 1-7.
Office action mailed on Apr. 28, 2015 for the Taiwan application No. 102120966, filed Jun. 13, 2013, p. 1-5.

* cited by examiner

*Primary Examiner* — Peter Vincent Agustin
(74) *Attorney, Agent, or Firm* — Winston Hsu; Scott Margo

(57) ABSTRACT

A method for performing a predefined function on a touch-based mobile device includes displaying a lock-screen image on the touch screen of the mobile device during a locked-state, wherein the lock-screen image comprises a plurality of image pieces; detecting an object on or near the touch screen at a first predefined location corresponding to a predefined image piece of the plurality of image pieces; moving the predefined image piece on the touch screen according to movement of the object; and performing a predefined function on the mobile device when the predefined image piece moves from the first predefined location to a second predefined location on the touch screen.

21 Claims, 12 Drawing Sheets

UNLOCK METHOD AND MOBILE DEVICE USING THE SAME

TECHNICAL FIELD

The present invention relates to an unlock method for a touch controlled mobile device, and more specifically, to a simple and secure one-step unlock method and a mobile device using the same.

BACKGROUND

Touch-control interface is now widely used in mobile devices, such as cell phones, personal digital assistants (PDAs), etc. Generally, a touch-controlled mobile device includes a lock screen to prevent unauthorized or unintentional access to the device, and needs to undergo a two-stage unlocking process when resuming normal operation from sleep mode. A first operation needs to be performed on an unlock screen displayed on the device (e.g. slide to unlock) to prevent unintentional touch s during sleep mode. Next, a second unlock operation (e.g. entering a password) needs to be performed to prevent unauthorized access to the device.

However, such two-stage unlocking process can be cumbersome. As a result, many users are discouraged from configuring a second-stage unlock operation for their mobile devices, thus posing a potential security loophole. Therefore, searching for a simple yet secure unlock method for mobile devices has become a common goal for the industry.

SUMMARY

It is therefore an objective of the present invention to provide a simple and secure unlock method for a mobile device.

The present invention discloses a method for performing a predefined function on a touch-based mobile device in a locked state. The method comprises displaying a lock-screen image on the touch screen of the mobile device during a locked-state, wherein the lock-screen image comprises a plurality of image pieces; detecting an object on or near the touch screen at a first predefined location corresponding to a predefined image piece of the plurality of image pieces; moving the predefined image piece on the touch screen according to movement of the object; and performing a predefined function on the mobile device when the predefined image piece moves from the first predefined location to a second predefined location on the touch screen.

The present invention further discloses a non-transitory computer-readable medium embodying a program executable in a computing device. The program comprises code for displaying a lock-screen image on a touch screen of the computing device during a locked-state, wherein the lock-screen image comprises a plurality of image pieces; code for detecting an object on or near the touch screen at a first predefined location corresponding to a predefined image piece of the plurality of image pieces; code for moving the predefined image piece on the touch screen according to movement of the object; and code for performing a predefined function on the computing device when the predefined image piece moves from the first predefined location to a second predefined location on the touch screen.

The present invention further discloses a touch-based mobile device, comprising a touch screen, for receiving touch control and displaying data; one or more processors; and a storage unit, for storing a program code executed by the one or more processors to perform the following steps: displaying a lock-screen image on the touch screen during a locked-state, wherein the lock-screen image comprises a plurality of image pieces; detecting an object on or near the touch screen at a first predefined location corresponding to a predefined image piece of the plurality of image pieces; moving the predefined image piece on the touch screen according to movement of the object; and performing a predefined function on the mobile device when the predefined image piece moves from the first predefined location to a second predefined location on the touch screen.

DETAILED DESCRIPTION

Figure 1:
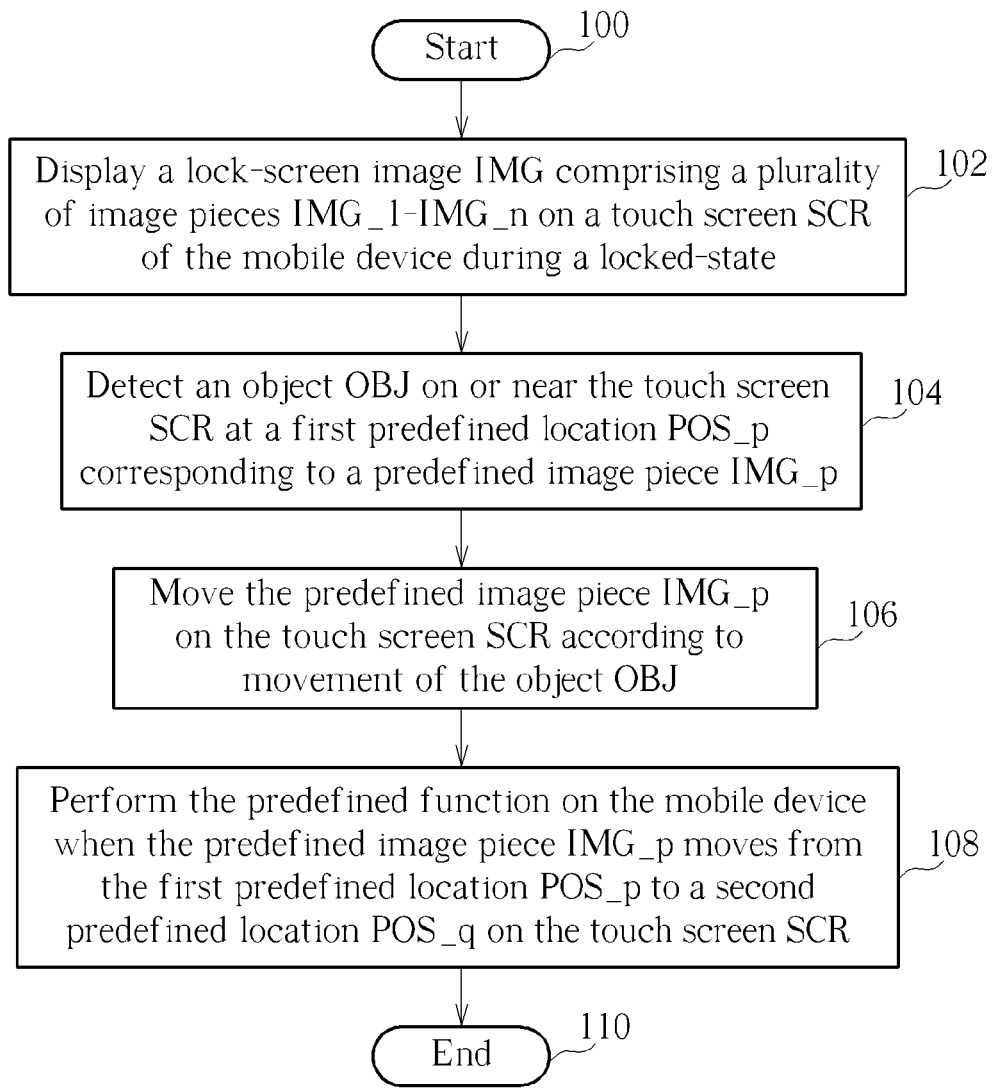
FIG. 1 is a schematic diagram of a process according to an example of the present invention.

Please refer to FIG. 1, which is a schematic diagram of a process 10 according to an example of the present invention. The process 10 is utilized for performing a predefined function on a mobile device. The process 10 includes the following steps:

Step 100: Start.

Step 102: Display a lock-screen image IMG comprising a plurality of image pieces IMG_1-IMG_n on a touch screen SCR of the mobile device during a locked-state.

Step 104: Detect an object OBJ on or near the touch screen SCR at a first predefined location POS_p corresponding to a predefined image piece IMG_p.

Step 106: Move the predefined image piece IMG_p on the touch screen SCR according to movement of the object OBJ.

Step 108: Perform the predefined function on the mobile device when the predefined image piece IMG_p moves from the first predefined location POS_p to a second predefined location POS_q on the touch screen SCR.

Step 110: End.

According to the process 10, the user may perform the predefined function (e.g., unlocking the mobile device, displaying information, or modifying one or more settings of the mobile device) in a single step (i.e., moving the predefined image piece IMG_p from the first predefined location POS_p to a second predefined location POS_q on the touch screen SCR), which is much simpler and faster than conventional security unlock method (e.g. entering a password).

In more detail, please refer to FIGS. 2A-2H, which illustrate an exemplary user interface of a mobile device in the process 10 according to an example of the present invention.

Figure 2A:
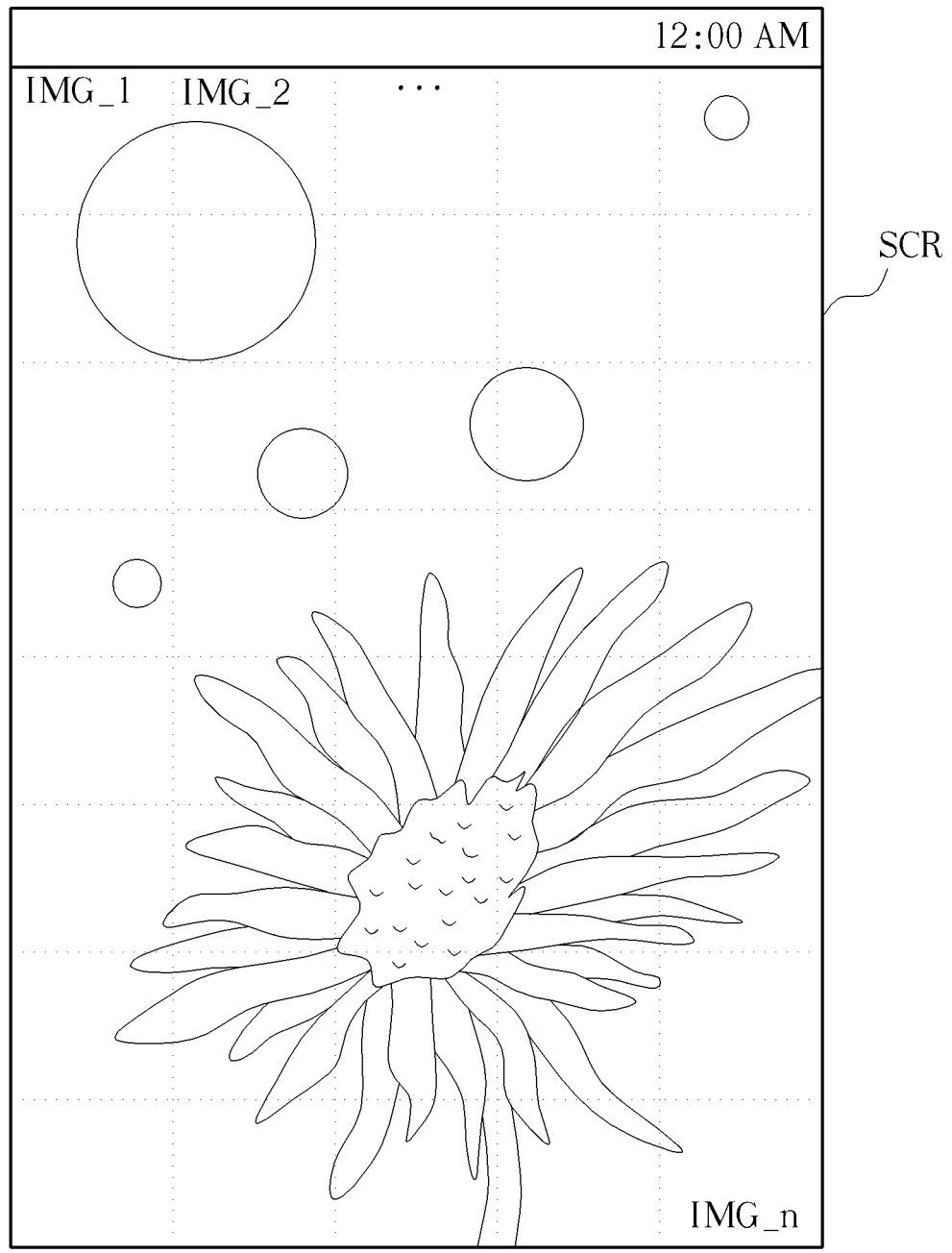
FIG. 2A to FIG. 2J illustrate an exemplary user interface of a mobile device in the process shown in FIG. 1 according to an example of the present invention.

In Step 102, as shown in FIG. 2A, when the mobile device is during the locked-state, the touch screen SCR displays a user customized image or a default wallpaper image as the lock-screen image IMG instead of the normal user interface of the mobile device, so as to prevent unintentional or unauthorized access to the device. The lock-screen image IMG comprises movable image pieces IMG_1-IMG_n. Note that, dotted lines shown in FIGS. 2A-2D and 2F-2H represent boundaries of the image pieces IMG_1-IMG_n, which are invisible when the mobile device is during the locked-state, and may be shown by the dotted lines or other types of lines in a setting mode. However, in order to clearly illustrate operations of the process 10, the boundaries are shown in FIGS. 2A-2D and 2F-2H. Preferably, the lock-screen image IMG contains no visual prompt as to how to unlock the mobile device, and the image pieces IMG_1-IMG_n may be rectangular blocks.

Figure 2B:
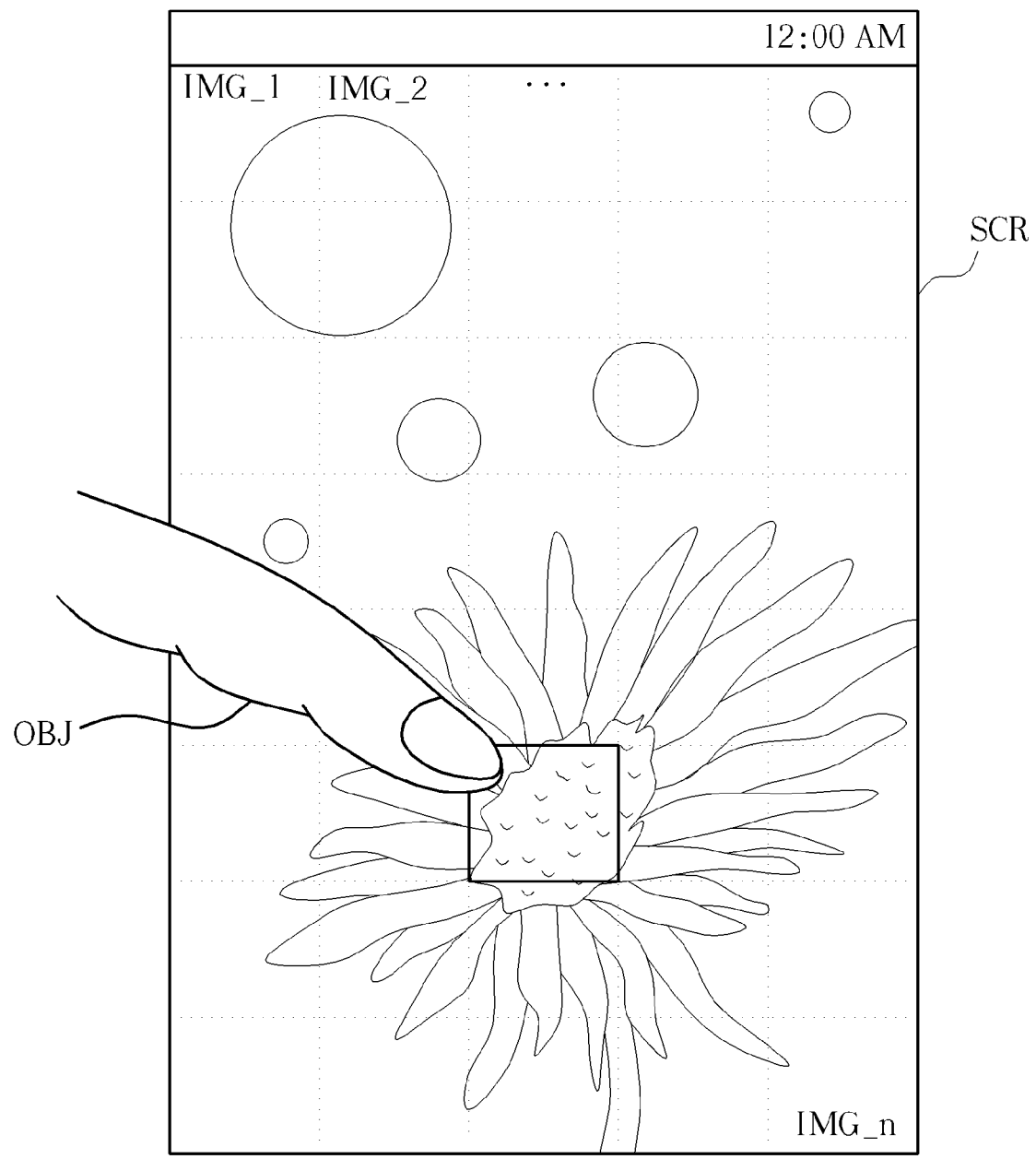
Figure 2C:
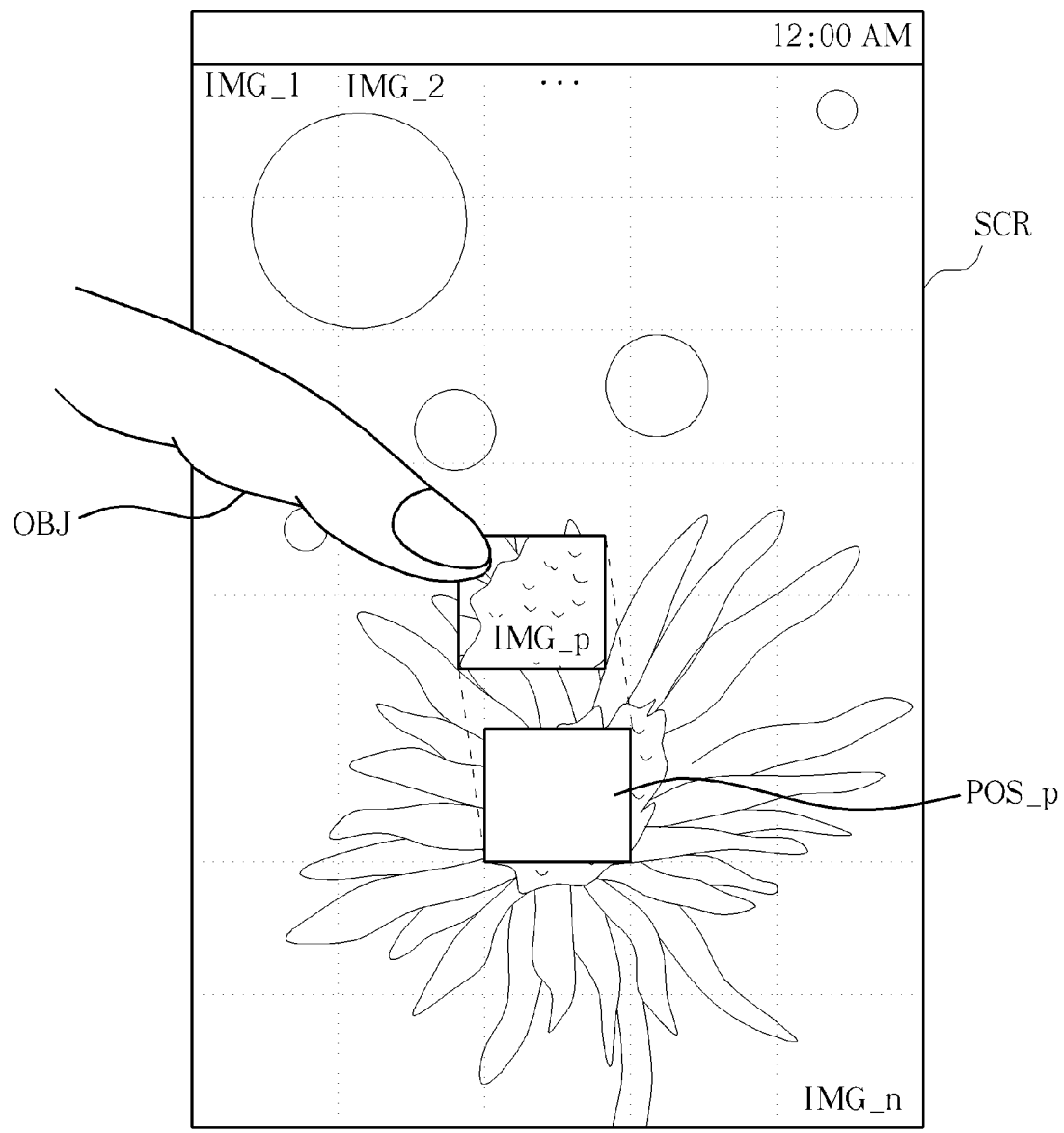

In Step 104, as shown in FIG. 2B, the user may use the object OBJ to approach or contact with a predefined image piece IMG_p on the touch screen SCR. The object OBJ may be a stylus, the user's finger, or any other means capable of controlling the touch screen SCR. In response to detecting the object OBJ on or near the touch screen SCR at the first predefined location corresponding to the predefined image piece IMG_p at an initial position POS_p, the predefined image piece IMG_p may become floating and moveable, such that the user may use the object OBJ to drag the image piece IMG_p around the touch screen SCR, as shown in FIG. 2C. As the image piece IMG_p is moved around the touch screen SCR, there can optionally be various visual effect to act as feedback to indicate the user the movement is being received; for example, the predefined image piece IMG_p may be brightened, and other image pieces may be shadowed. Note that, the first predefined location may be defined by pixels within an area corresponding to the image piece IMG_p in the touch screen.

Figure 2D:
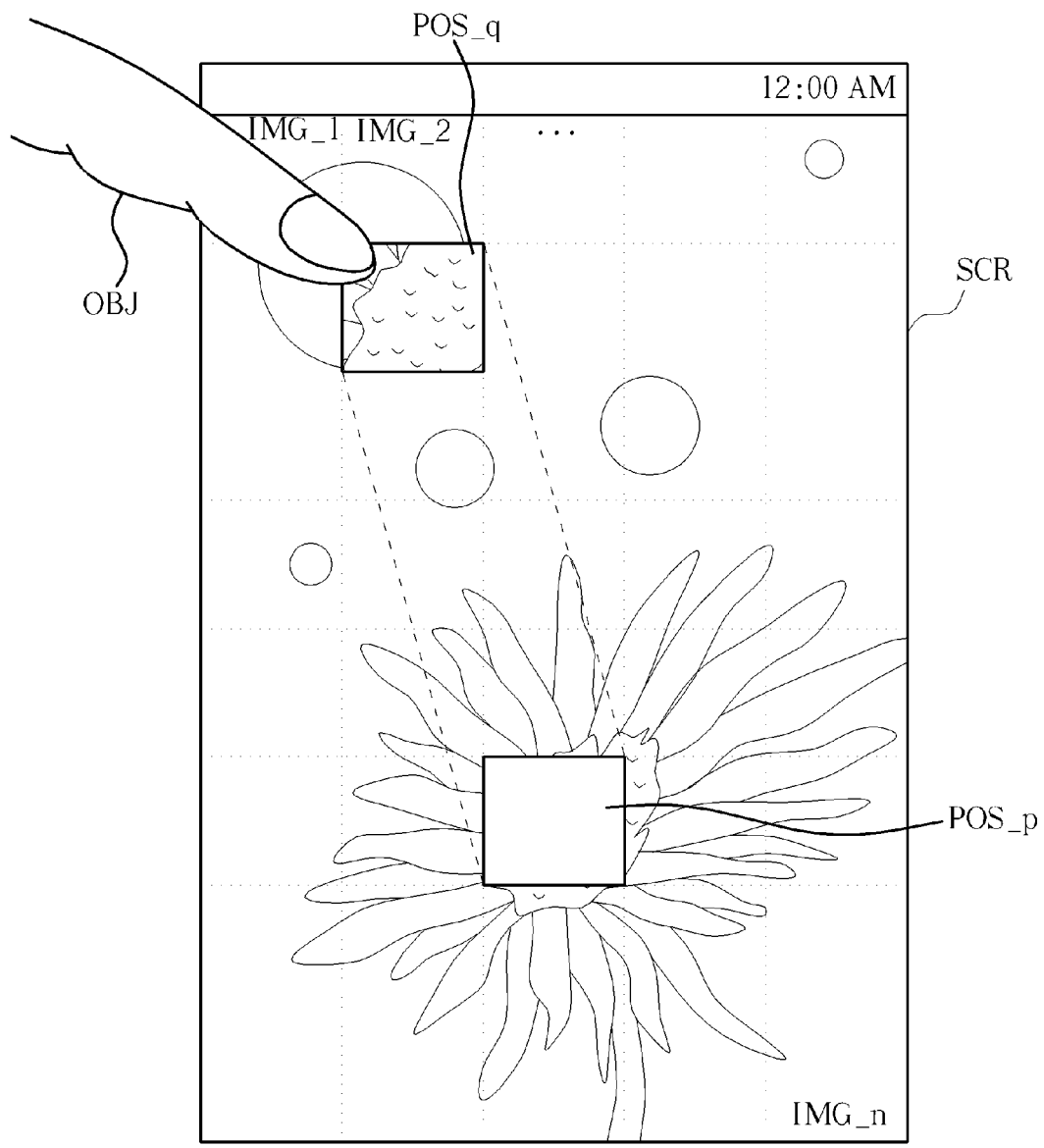
Figure 2E:
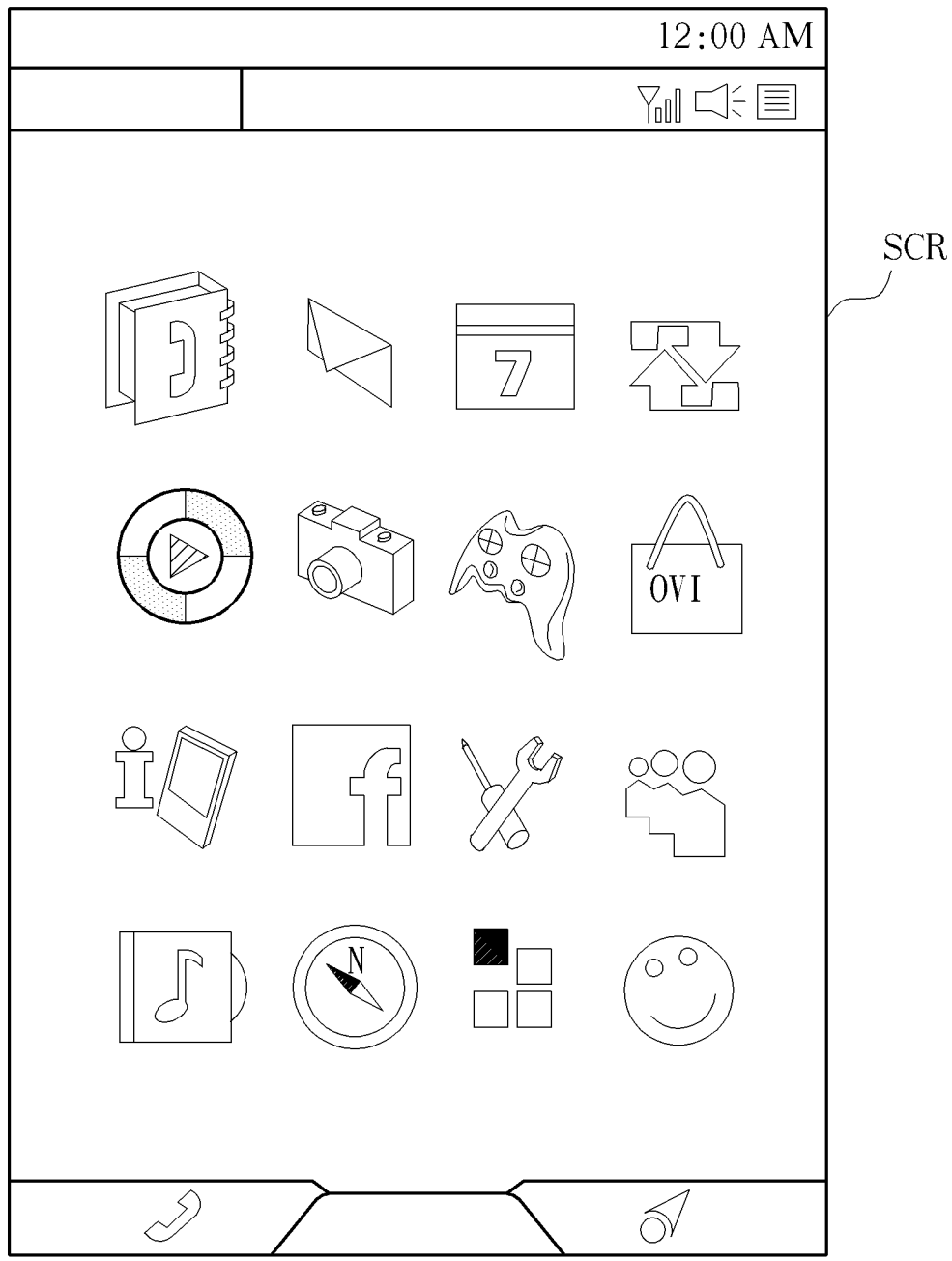

Next, in Step 106, as shown in FIG. 2D, if the object OBJ moves the image piece IMG_p from the first predefined location POS_p to a second predefined location POS_q on the touch screen SCR, a predefined function is performed. In one embodiment, the predefined function is performed when further detecting the object OBJ is no longer near or on the touch screen SCR. Preferably, the predefined function may be unlocking the mobile device to enter an unlocked state as shown in FIG. 2E, so that the user may operate the mobile device normally. In one embodiment, once the object OBJ is no longer detected on or near the touch screen SCR, the image piece IMG_p moves back to the initial location.

On the contrary, if the user selects an image piece other than the predefined image piece IMG_p or selects the image piece IMG_p but moves the image piece IMG_p to a location other than the second predefined location POS_q, once the object OBJ is no longer detected on or near the touch screen SCR, the selected image moves back to its initial location to display the lock-screen image IMG as shown in FIG. 2A.

Figure 2F:
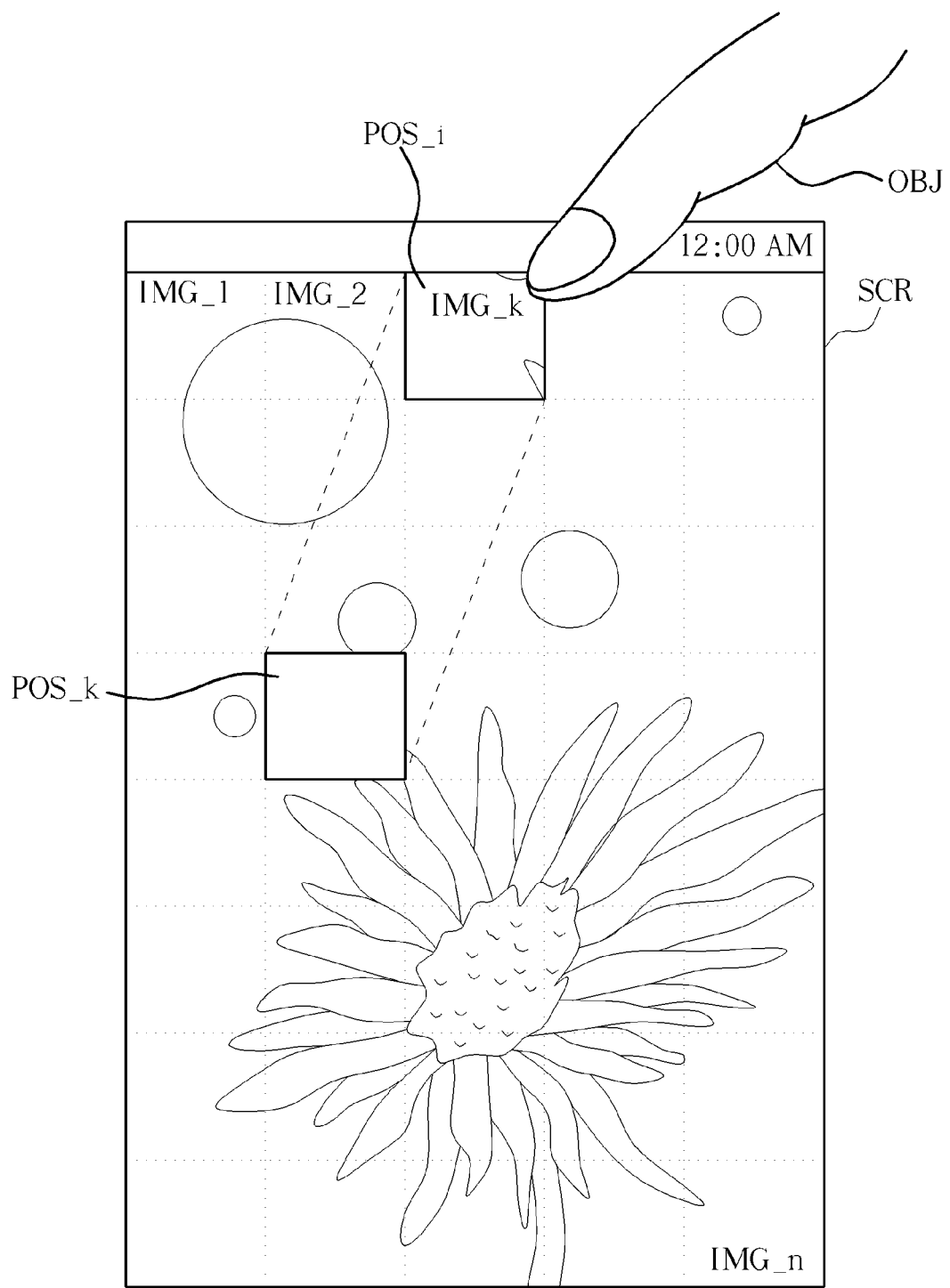
Figure 2G:
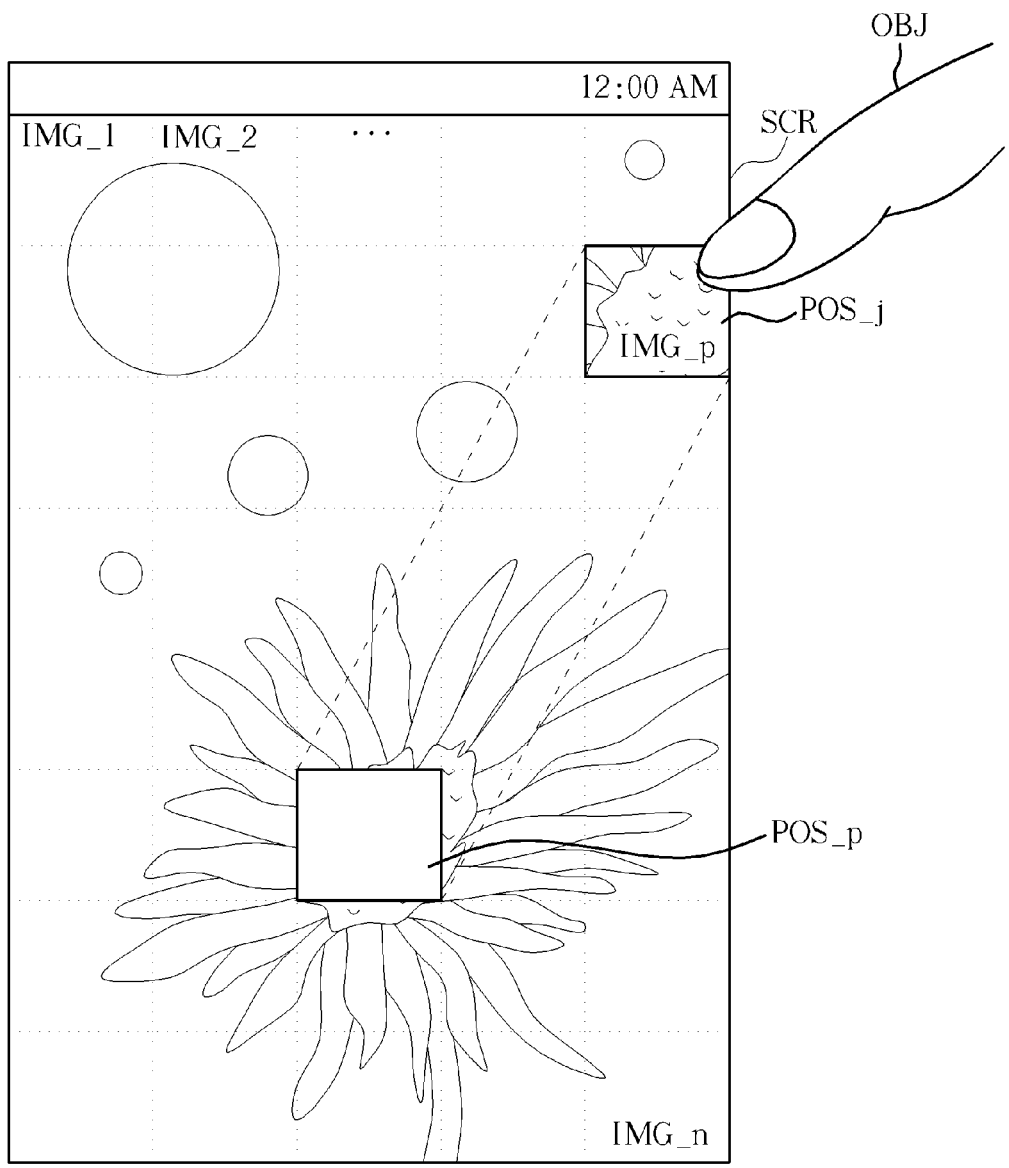

Please refer to FIG. 2F, for example, when the user incorrectly selects an image piece IMG_k by touching the touch screen SCR at a location POS_k corresponding to the image piece IMG_k and moves it to another arbitrary location POS_i (or even the location POS_q) on the touch screen SCR, then the image piece IMG_k moves back to its initial position after the object OBJ leaves the touch screen SCR. As a result, the predefined function (e.g., unlocking the mobile device) is not performed, and the mobile device remains in the locked-state. Similarly, as shown in FIG. 2G, if the user correctly selects the predefined image piece IMG_p at the location POS_p, yet incorrectly move it to the location POS_j, then the predefined function (e.g., unlocking the mobile device) is not performed and the mobile device remains in the locked-state.

Figure 2H:
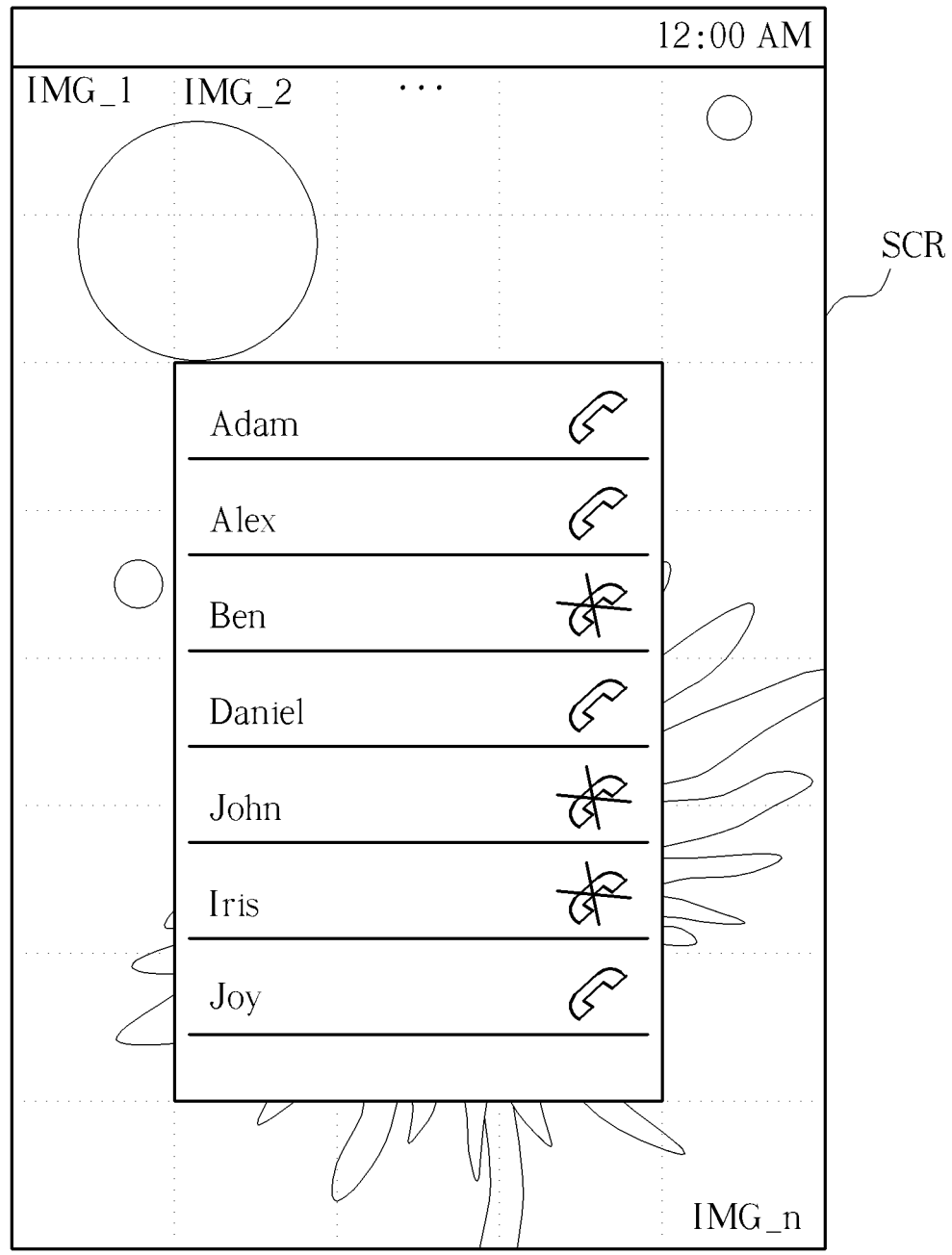

Alternatively, when the user selects an image piece other than the predefined image piece IMG_p or selects the image piece IMG_p but moves the image piece IMG_p to an arbitrary or specified location other than the second predefined location POS_q, calendar events, missed calls, call history, etc. may be shown first, and then the lock-screen SCR returns to its original state displaying the lock-screen image IMG as shown in FIG. 2A to indicate that the predefined function (e.g., unlocking the mobile device) is not performed. For example, FIG. 2H shows an example of a popup call history on the lock-screen image IMG when the user selects an image piece other than the predefined image piece IMG_p or moves the image piece IMG_p to a location other than the second predefined location POS_q.

Specifically, the first predefined location POS_p and the second predefined location POS_q are customizable, and may be user-defined when the mobile device is in the unlocked state. In other words, the user may define how to move the predefined image piece IMG_p as a part of the security settings. Therefore, only the user who configures the security settings would know which image piece of the image pieces IMG_1-IMG_n to select, and where to move it in order to unlock the mobile device. Accordingly, when an unknown third party tries to access the mobile device, if an incorrect image piece is selected, or if the predefined image piece IMG_p is moved to an incorrect position other than the location POS_q, then the mobile device is not unlocked and remains in the locked state, as shown in FIGS. 2F and 2G. In other words, the user only has to remember a starting and ending position of the predefined image piece, to access the mobile device securely in a single-step unlock operation. Note that, as mentioned above, the dotted lines representing boundaries of the image pieces IMG_1-IMG_n are invisible to the user in normal operation, and can only be shown in the setting mode.

Figure 2I:
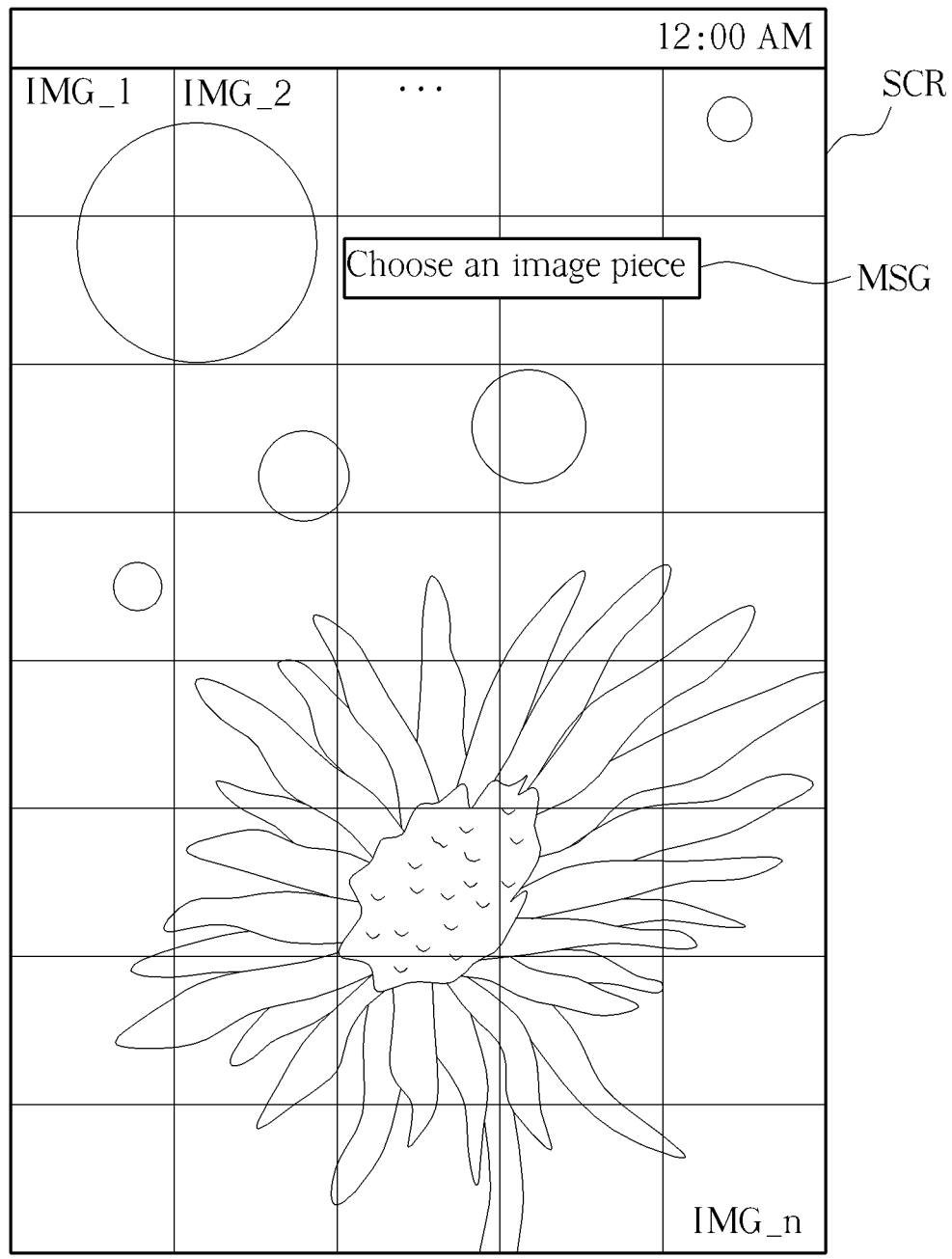
Figure 2J:
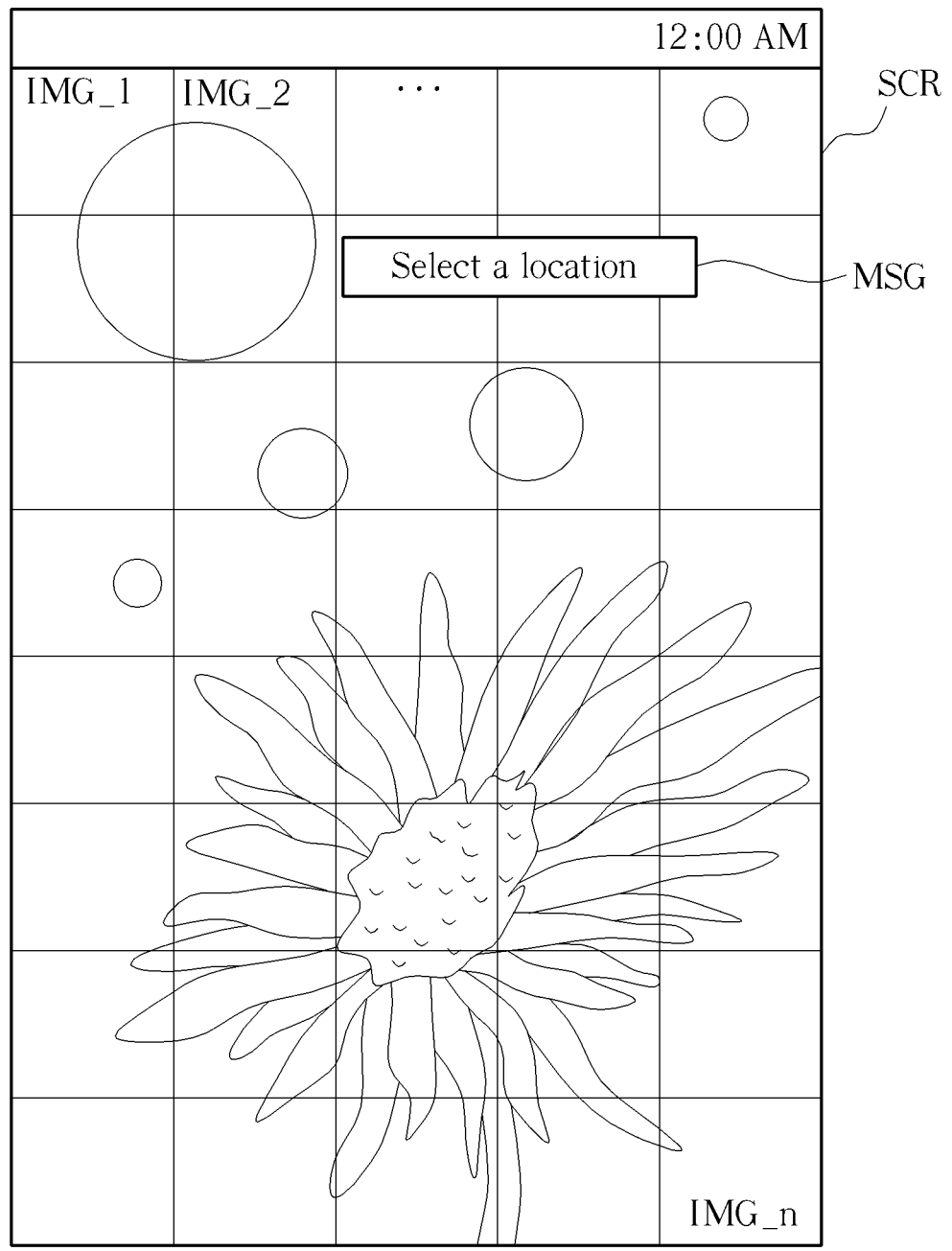

As abovementioned, the dotted lines shown in FIGS. 2A-2D and 2F-2H are invisible when the mobile device is during the locked-state, and may be shown in a setting mode. For example, as shown in FIG. 2I, when the mobile device is under the setting mode, the mobile device may show boundaries of the image pieces IMG_1-IMG_n on the screen SCR and pop up a message window MSG indicating the user to choose an image piece. After the user choose an image piece (e.g. IMG_p), the mobile device may ask the user to select a location (e.g. POS_q) to complete the setting mode.

Figure 3:
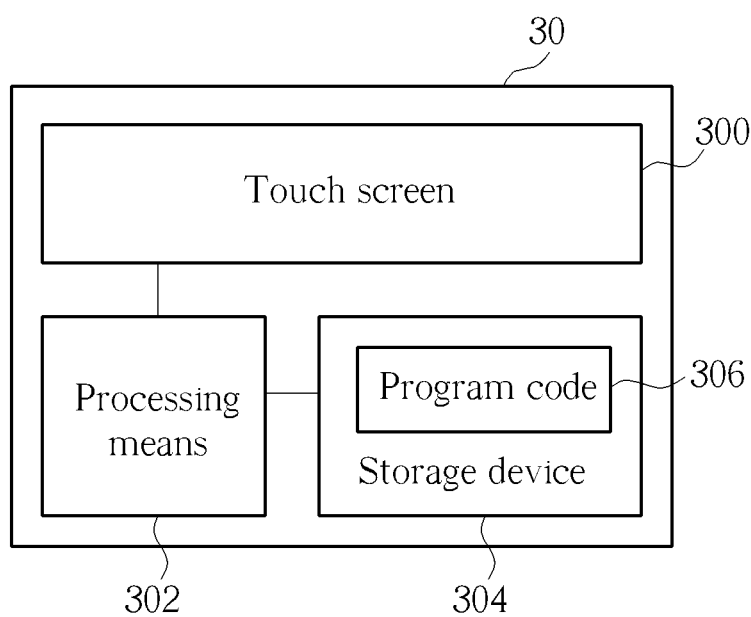
FIG. 3 is a schematic diagram of a mobile device according to an example of the present invention.

Each step of the unlocking process 10 may be compiled into corresponding program code to implement the process 10 in a mobile device. Please refer to FIG. 3, which is a schematic diagram of a mobile device 30 according to an example of the present invention. The mobile device 30 includes a touch screen 300, one or more processors 302, a storage unit 304, and a program code 306. The program code 306 is stored in the storage unit 304, and can be executed by the one or more processors 302 to perform operations corresponding to the unlock process 10 according to user gestures received by the touch screen 300. Implementing the process 10 through the program code 306 should be well-known to those skilled in the art, and is not detailed here. Notably, the one or more processors 302 and the storage unit 304 of the mobile device 30 may be implemented via hardware, software, or firmware, etc., though not limited thereto. The mobile device 30 may be any electronic product such as mobile phone, personal digital assistant (PDA), etc.

Note that in the context of this disclosure, a non-transitory computer-readable medium stores programs for use by or in connection with an instruction execution system, apparatus, or device. In this regard, one example, among others, is a non-transitory computer-readable medium embodying a program executable in a computing device such as the mobile device 30 in FIG. 3. In accordance with such examples, the program comprises code for displaying an lock-screen image IMG comprising a plurality of image pieces IMG_1-IMG_n on the touch screen SCR of the computing device during the locked-state, code for detecting an object OBJ on or near the touch screen SCR at a first predefined location POS_p corresponding to a predefined image piece IMG_p of the plurality of image pieces IMG_1-IMG_n, code for moving the predefined image piece IMG_p on the touch screen SCR according to movement of the object OBJ, and code for performing a predefined function on the computing device when the predefined image piece IMG_p moves from the first predefined location POS_p to a second predefined location POS_q on the touch screen SCR.

Notably, the spirit of the invention is to provide a simple yet secure method for users to unlock a mobile device via a single-step operation of moving a portion of the lock-screen image in a predefined way. Suitable modifications or variations may be made by those skilled in the art, and are not limited to the examples above. For example, the lock-screen image IMG is not limited to being composed of a set of equal-sized rectangular image pieces IMG_1-IMG_n, but may be image pieces of any shape, size, or quantity. For example, the size of the predefined image piece may be adjusted to be smaller than other image pieces, and thus it would require a higher precision when unlocking the device, thereby increasing level of security.

Also, the unlock method may also require the user to move more than one predefined image piece to more than one predefined location on the lock screen. For example, the device may be unlocked by sequentially moving several image pieces to different corresponding positions on the lock-screen. Alternatively, the device may be unlocked by simultaneously moving several positions on the lock-screen via a multi-finger gesture. Moreover, moving the image piece may be required to follow a predefined path, or to remain over the predefined location for a specific duration, in order for the function to be validated. Also, in the above example, the image piece moves back to its original location, after a failed attempt, though this is not limited.

Additionally, when the predefined image piece is moved to the predefined location, the function performed on the mobile device is not limited to unlocking the device to enter the unlocked state. The function performed may also be modifications to specific settings of the device, e.g. setting a mobile phone to a silent mode, such that the user can quickly adjust settings of the mobile device without having to unlock the device and performing corresponding configurations. On the other hand, the function performed may also be to access and/or display specific data on the lock screen image, without exiting the locked state, e.g. show calendar events, missed calls, call history etc., such the user may quickly access certain data on the mobile device on the lock screen, without having to first unlock the device and access the data, whereas an unauthorized user would not be able to access such data on the lock-screen. Alternatively, the function performed may also be make emergency calls, which needs to be quickly performed under emergency circumstances.

In the prior art, a cumbersome two-stage unlocking process is needed to prevent unintentional or unauthorized access to a mobile device under locked mode. In comparison, the present invention provides a simple, secure, and customizable unlock method by allowing users simply move a portion of the lock screen image in a predefined way to unlock the device or to quickly perform certain functions.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for controlling a mobile device with a touch screen, comprising:
  displaying a lock-screen image on the touch screen of the mobile device during a locked-state, wherein the lock-screen image comprises a plurality of image pieces;
  detecting an object on or near the touch screen at a first predefined location corresponding to a predefined image piece of the plurality of image pieces at an initial position;
  moving the predefined image piece on the touch screen according to movement of the object; and
  performing a predefined function on the mobile device when the predefined image piece moves from the first predefined location to a second predefined location on the touch screen;
  wherein the lock-screen image does not suggest a user to move the predefined image piece from the first predefined location to the second predefined location, and the predefined image piece, the first predefined location and the second predefined location are user-defined;
  wherein the predefined function comprises modifying one or more settings of the mobile device during the locked-state.

2. The method of claim 1, wherein the predefined function comprises unlocking the mobile device.

3. The method of claim 1, wherein the plurality of image pieces are a plurality of rectangular image pieces.

4. The method of claim 1, wherein the lock-screen image comprises no visual prompt for unlocking the mobile device.

5. The method of claim 1, further comprising:
  in response to detecting that the object is no longer on or near the touch screen, moving the predefined image piece back to the initial position.

6. The method of claim 1, wherein the predefined function comprises displaying information on the lock-screen image during the locked-state.

7. A non-transitory computer-readable medium embodying a program executable in a computing device, the program comprising:
  code for displaying a lock-screen image on a touch screen of the computing device during a locked-state, wherein the lock-screen image comprises a plurality of image pieces at an initial position;
  code for detecting an object on or near the touch screen at a first predefined location corresponding to a predefined image piece of the plurality of image pieces;
  code for moving the predefined image piece on the touch screen according to movement of the object; and
  code for performing a predefined function on the computing device when the predefined image piece moves from the first predefined location to a second predefined location on the touch screen;
  wherein the lock-screen image does not suggest a user to move the predefined image piece from the first predefined location to the second predefined location, and the predefined image piece, the first predefined location and the second predefined location are user-defined;
  wherein the predefined function comprises modifying one or more settings of the mobile device during the locked-state.

8. The non-transitory computer-readable medium of claim 7, wherein the predefined function comprises unlocking the mobile device.

9. The non-transitory computer-readable medium of claim 7, wherein the plurality of image pieces are a plurality of rectangular image pieces.

10. The non-transitory computer-readable medium of claim 7, wherein the lock-screen image comprises no visual prompt for unlocking the mobile device.

11. The non-transitory computer-readable medium of claim 7, wherein the program further comprises:
   code for, in response to detecting that the object is no longer on or near the touch screen, moving the predefined image piece back to the initial position.

12. The non-transitory computer-readable medium of claim 7, wherein the predefined function comprises displaying information on the lock-screen image during the locked-state.

13. A touch-based mobile device, comprising:
   a touch screen, for receiving touch control and displaying data;
   one or more processors; and
   a storage unit, for storing a program code executed by the one or more processors to perform the following steps:
      displaying a lock-screen image on the touch screen during a locked-state, wherein the lock-screen image comprises a plurality of image pieces;
      detecting an object on or near the touch screen at a first predefined location corresponding to a predefined image piece of the plurality of image pieces at an initial position;
      moving the predefined image piece on the touch screen according to movement of the object; and
      performing a predefined function on the mobile device when the predefined image piece moves from the first predefined location to a second predefined location on the touch screen;
   wherein the lock-screen image does not suggest a user to move the predefined image piece from the first predefined location to the second predefined location, and the predefined image piece, the first predefined location and the second predefined location are user-defined;
   wherein the predefined function comprises modifying one or more settings of the mobile device during the locked-state.

14. The mobile device of claim 13, wherein the predefined function comprises unlocking the mobile device.

15. The mobile device of claim 13, wherein the plurality of image pieces are a plurality of rectangular image pieces.

16. The mobile device of claim 13, wherein the lock-screen image comprises no visual prompt for unlocking the mobile device.

17. The mobile device of claim 13, wherein the program code is executed by the one or more processors to further perform:
   in response to detecting that the object is no longer on or near the touch screen, moving the predefined image piece back to the initial position.

18. The mobile device of claim 13, wherein the predefined function comprises displaying information on the lock-screen image during the locked-state.

19. A method for controlling a mobile device with a touch screen, comprising:
   displaying a lock-screen image on the touch screen of the mobile device during a locked-state, wherein the lock-screen image comprises a plurality of image pieces;
   detecting an object on or near the touch screen at a first predefined location corresponding to a predefined image piece of the plurality of image pieces at an initial position;
   moving the predefined image piece on the touch screen according to movement of the object;
   performing a predefined function on the mobile device when the predefined image piece moves from the first predefined location to a second predefined location on the touch screen; and
   displaying a message when detecting the object on or near the touch screen at a first location to select one of the plurality of image pieces other than the predefined image piece or the predefined image piece moves to a second location other than a the second predefined location, wherein the message comprises a popup missed call;
   wherein the lock-screen image does not suggest a user to move the predefined image piece from the first predefined location to the second predefined location, and the predefined image piece, the first predefined location and the second predefined location are user-defined.

20. A non-transitory computer-readable medium embodying a program executable in a computing device, the program comprising:
   code for displaying a lock-screen image on a touch screen of the computing device during a locked-state, wherein the lock-screen image comprises a plurality of image pieces at an initial position;
   code for detecting an object on or near the touch screen at a first predefined location corresponding to a predefined image piece of the plurality of image pieces;
   code for moving the predefined image piece on the touch screen according to movement of the object;
   code for performing a predefined function on the computing device when the predefined image piece moves from the first predefined location to a second predefined location on the touch screen; and
   displaying a message when detecting the object on or near the touch screen at a first location to select one of the plurality of image pieces other than the predefined image piece or the predefined image piece moves to a second location other than a the second predefined location, wherein the message comprises a popup missed call;
   wherein the lock-screen image does not suggest a user to move the predefined image piece from the first predefined location to the second predefined location, and the predefined image piece, the first predefined location and the second predefined location are user-defined.

21. A touch-based mobile device, comprising:
   a touch screen, for receiving touch control and displaying data;
   one or more processors; and
   a storage unit, for storing a program code executed by the one or more processors to perform the following steps:
      displaying a lock-screen image on the touch screen during a locked-state, wherein the lock-screen image comprises a plurality of image pieces;
      detecting an object on or near the touch screen at a first predefined location corresponding to a predefined image piece of the plurality of image pieces at an initial position;
      moving the predefined image piece on the touch screen according to movement of the object;
      performing a predefined function on the mobile device when the predefined image piece moves from the first predefined location to a second predefined location on the touch screen; and
      displaying a message when detecting the object on or near the touch screen at a first location to select one of the plurality of image pieces other than the predefined image piece or the predefined image piece moves to a second location other than a the second predefined location, wherein the message comprises a popup missed call;

wherein the lock-screen image does not suggest a user to move the predefined image piece from the first predefined location to the second predefined location, and the predefined image piece, the first predefined location and the second predefined location are user-defined.

* * * * *